(12) United States Patent
Agrawal et al.

(10) Patent No.: US 6,230,151 B1
(45) Date of Patent: May 8, 2001

(54) PARALLEL CLASSIFICATION FOR DATA MINING IN A SHARED-MEMORY MULTIPROCESSOR SYSTEM

(75) Inventors: Rakesh Agrawal; Ching-Tien Ho, both of San Jose, CA (US); Mohammed J. Zaki, Rochester, NY (US)

(73) Assignee: International Business Machines Corporation, Armonk, NY (US)

( * ) Notice: Subject to any disclaimer, the term of this patent is extended or adjusted under 35 U.S.C. 154(b) by 0 days.

(21) Appl. No.: 09/061,808

(22) Filed: Apr. 16, 1998

(51) Int. Cl.[7] .................................................... G06F 15/18
(52) U.S. Cl. .............................. 706/12; 706/12; 707/101
(58) Field of Search .................................. 395/706; 705/6; 706/49, 50, 12; 707/1, 101

(56) References Cited

U.S. PATENT DOCUMENTS

| | | | | |
|---|---|---|---|---|
| 4,825,354 | * | 4/1989 | Agrawal et al. | 364/200 |
| 5,463,773 | * | 10/1995 | Sakaibara et al. | 717/1 |
| 5,615,341 | * | 3/1997 | Agrawal et al. | 705/10 |
| 5,668,988 | * | 9/1997 | Chen et al. | 707/101 |
| 5,742,811 | * | 4/1998 | Agarwal et al. | 707/6 |
| 5,819,266 | * | 10/1998 | Agrawal et al. | 707/6 |
| 5,864,839 | * | 1/1999 | Bourgoin | 707/1 |
| 5,875,285 | * | 2/1999 | Chang | 717/5 |
| 5,884,305 | * | 3/1999 | Kleingerg et al. | 707/6 |
| 5,884,320 | * | 3/1999 | Agarwal et al. | 707/104 |
| 5,899,992 | * | 5/1999 | Iyer et al. | 707/7 |
| 5,960,446 | * | 9/1999 | Schmuck et al. | 707/205 |
| 6,003,029 | * | 12/1999 | Agrawal et al. | 707/7 |

OTHER PUBLICATIONS

Holt et al., "Efficient mining of association rules in text databases", CIKM ACM, pp 234–242, Jan. 1999.*

Anand et al, "The role of domain kowledge in data mining", CIKM ACM pp 37–43, Jun. 1995.*

Cromp et al., "Data mining of multidimensional remotely sensed images", CIKM ACM, pp 471–480, Nov. 1993.*

Shafer et al, "Sprint a scalable parallel classifier for data mining", Proc. of the 22nd VLDN conf., pp 544–555, 1996.*

Oguchi et al, "Dynamic remote memory acquistion for parallel mining on ATM connecetd PC cluster", ACM ICS, pp 246–252, Jan. 1991.*

Weiss, "Strip mining on SIMD architecture", ACM pp 234–243, Jan. 1991.*

Goil et al, "High performance multidimensional analysis of large datasets", ACM DOLAP, pp 34–39, Aug. 1998.*

Muller et al, "A high perfromnce multi structure file system design", ACM pp 56–67, Mar. 1991.*

Callahan et al, "Parallel implementation of a frontal finite element solver on multiple platform", ACM SAC pp 491–495, Apr. 1999.*

Kennedy et al, "Optimizing for parallelism and data locality", ACM ICS pp 323–334, Jun. 1992.*

(List continued on next page.)

Primary Examiner—Paul R. Lintz
Assistant Examiner—Anil Khatri
(74) Attorney, Agent, or Firm—Khanh Q. Tran; Marc D. McSwain

(57) ABSTRACT

A method and system for generating a decision-tree classifier in parallel in a shared-memory multiprocessor system is disclosed. The processors first generate in the shared memory an attribute list for each record attribute. Each attribute list is assigned to a processor. The processors independently determine the best splits for their respective assigned lists, and cooperatively determine a global best split for all attribute lists. The attribute lists are reassigned to the processors and split according to the global best split into the lists for child nodes. The split attribute lists are again assigned to the processors and the process is repeated for each new child node until each attribute list for the new child nodes includes only tuples of the same record class or a fixed number of tuples.

51 Claims, 16 Drawing Sheets

OTHER PUBLICATIONS

Agrawl et al, "Automatic subspace clustring of high dimensional data for data mining applications", ACM SIGMOD, pp 94–105, May 1998.*

Li et al, "Free parallel data mining", ACM SIGMOD, pp 541–543, May 1998.*

Shintani et al, "Parallel mining algorithms for genearlized association rules with classification hierarchy", ACM SIGMOD pp 25–36, May 1998.*

Zaki et al, "Parallel classification for data mining on shared memeory multiprocessors", IEEE, pp 198–205, 1999.*

Zaki et al, "Evaluation of sampling for data mining of association rules", IEEE pp 42–50, 1997.*

Agrawal, "Parallel mining of association rules", IEEE, vol. 8, No. 6, pp 962–969, Dec. 1996.*

Park et al, "Efficient parallel data mining for association rules", ACM CIKM, pp 31–36, Jun. 1995.*

Zaki et al., "A localized algorithm for parallel association mining", ACM SPAA, pp 321–330, 1996.*

* cited by examiner

| Tid | Age | Car Type | Risk |
|---|---|---|---|
| 0 | 23 | family | High |
| 1 | 17 | sports | High |
| 2 | 43 | sports | High |
| 3 | 68 | family | Low |
| 4 | 32 | truck | Low |
| 5 | 20 | family | High |

| Processor 1 | | |
|---|---|---|
| Age | Class | Tid |
| 17 | High | 1 |
| 20 | High | 5 |
| 23 | High | 0 |
| 32 | Low | 4 |
| 43 | High | 2 |
| 68 | Low | 3 |

| Processor 2 | | |
|---|---|---|
| Car Type | Class | Tid |
| family | High | 0 |
| sports | High | 1 |
| sports | High | 2 |
| family | Low | 3 |
| truck | Low | 4 |
| family | High | 5 |

Node 0

FIG. 11

| Processor 1 | | |
|---|---|---|
| Age | Class | Tid |
| 17 | High | 1 |
| 20 | High | 5 |
| 23 | High | 0 |

| Processor 2 | | |
|---|---|---|
| Car Type | Class | Tid |
| family | High | 0 |
| sports | High | 1 |
| family | High | 5 |

Node 1

FIG. 12

| Processor 1 | | |
|---|---|---|
| Age | Class | Tid |
| 32 | Low | 4 |
| 43 | High | 2 |
| 68 | Low | 3 |

| Processor 2 | | |
|---|---|---|
| Car Type | Class | Tid |
| sports | High | 2 |
| family | Low | 3 |
| truck | Low | 4 |

Node 2

FIG. 13

BASIC

```
// Starting with the root node execute the
// following code for each new tree level
forall attributes in parallel (dynamic scheduling)
    for each block on K leaves
        for each leaf
            evaluate attributes (E)

barrier
if (master) then
    for each leaf
        get winning attribute; form hash-probe (W)

barrier
forall attributes in parallel (dynamic scheduling)
    for each leaf
        split attributes (S)
```

FIG. 14

MOVING-WINDOW-K (FWK)

// Starting with the root node execute the
// following code for each new tree level
forall attributes in parallel (dynamic scheduling)
    for each block on K leaves
        for each leaf i
            evaluate attributes (E)
        if (last leaf of block) then
            barrier
        if (last processor finishing on leaf i) then
            get winning attribute; form hash-probe (W)
barrier
forall attributes in parallel (dynamic scheduling)
    for each leaf
        split attributes (S)

*FIG. 16*

MOVING-WINDOW-K (MWK)

// Starting with the root node execute the
// following code for each new tree level
forall attributes in parallel (dynamic scheduling)
  for each block on K leaves
    for each leaf i
      if (last block's i-th leaf not done) then
        wait
      evaluate attributes (E)
      if (last processor finishing on leaf i) then
        get winning attribute; form hash-probe (W)
        signal that i-th leaf is done
barrier
forall attributes in parallel (dynamic scheduling)
  for each leaf
    split attributes (S)

FIG. 19

```
SubTree (Processor Group P = {p1, p2, ..., px}, Leaf Frontier L = {l1, l2, ..., ly})
    apply BASIC algorithm on L with P processors
    NewL = {l1, l2, ..., lm} //new leaf frontier if (NewL is empty) then
        put self in FREE queue
    elseif (group master) then
        get FREE processors; NewP = {p1, p2, ..., pn}
        if (only one leaf remaining) then
            SubTree (NewP, l1)
        elseif (only one processor in group) then
            SubTree (p1, NewL)
        else  // multiple leaves and processors
            split NewP into P1 and P2
            SubTree (P1, L1)
            SubTree (P2, L2)

wake up processors in NewP else  // not the group master
        go to sleep
```

FIG. 21

PARALLEL CLASSIFICATION FOR DATA MINING IN A SHARED-MEMORY MULTIPROCESSOR SYSTEM

FIELD OF THE INVENTION

The invention relates in general to computer data mining, and in particular to a highly scalable method and system for generating a decision tree classifier from data records in a shared-memory multiprocessor system.

BACKGROUND OF THE INVENTION

Data mining is an emerging application of computer databases that involves the development of tools for analyzing large databases to extract useful information from them. As an example of data mining, customer purchasing patterns may be derived from a large customer transaction database by analyzing its transaction records. Such purchasing habits can provide valuable marketing information to retailers in displaying their merchandise or controlling the store inventory. Other applications of data mining include fraud detection, store location search, and medical diagnosis.

Classification of data records according to certain classes of the records is an important part of data mining. In classification, a set of example records, referred to as a training set or input data, is provided from which a record classifier will be built. Each record of the training set consists of several attributes where the attributes can be either numeric or categorical. Numeric (or continuous) attributes are those from an ordered domain, such as employee age or employee salary. Categorical attributes are those from an unordered domain such as marital status or gender. One of these attributes, called the classifying attribute, indicates the class to which the record belongs. The objective of classification is to build a model of the classifying attribute, or classifier, based upon the other attributes. Once the classifier is built, it can be used to determine the classes of future records.

A decision-tree classifier is a class discriminator that recursively partitions the training set until each partition consists entirely or dominantly of examples from the same class. The tree generally has a root node, interior nodes, and multiple leaf nodes where each leaf node is associated with the records belonging to a record class. Each non-leaf node of the tree contains a split point which is a test on one or more attributes to determine how the data records are partitioned at that node. Decision trees are compact, easy to understand and to be converted to classification rules, or to Structured Query Language (SQL) statements for accessing databases.

For example, FIG. 1 shows a training set where each record represents a car insurance applicant and includes three attributes: Age, Car Type, and Risk level. FIG. 2 is a prior art decision-tree classifier created from the training records of FIG. 1. Nodes 20 and 22 are two split points that partition the records based on the split tests (Age<27) and (Car Type in {Sports}), respectively. The records of applicants whose age is less than 27 years belong to the High Risk class associated with node 24. The records of those older than 27 years but have a sport car belong to the High Risk class associated with node 26. Other applicants fall into the Low risk class of node 28. The decision tree then can be used to screen future applicants by classifying them into the High or Low Risk categories.

Prior to interest in classification for database-centric data mining, it was tacitly assumed that the training sets could fit in memory. Recent work has targeted the massive training sets usual in data mining. Developing classification models using larger training sets can enable the development of higher accuracy models. Examples of recent classification systems that can handle large disk-resident datasets include SLIQ and SPRINT. SLIQ is described in the assignee's U.S. patent application for "Method and System for Generating a Decision-Tree Classifier for Data Records," Ser. No. 08/564,694. It is a scalable decision-tree classifier in which the branches of the tree are built in parallel, breadth-first. However, SLIQ is limited by the amount of data that can be classified and, in a parallel computer such as a multiprocessor system, it does not take advantage of the system's parallelism to build the decision tree across the processors.

A serial version of SPRINT was described in the assignee's U.S. patent application for "Method and System for Generating a Decision-Tree Classifier Independent of System Memory Size," Ser. No. 08/646,893. Serial SPRINT also constructs the tree in a breadth-first order, but uses a one-time presorting technique to reduce the cost of numeric attribute evaluation. It initially creates a disk-based attribute list for each attribute in the data, where each entry of the list consists of an attribute value, a class label, and a tuple identifier (tid) of the corresponding data tuple. Initial lists for numeric attributes are sorted by attribute value, while those for categorical attributes stay in unsorted order. All attribute lists are initially associated with the root of the classification tree. As the tree is grown and split into subtrees, the attribute lists are also split. By preserving the order of records in the partitioned lists, no resorting is required. FIG. 3 shows an example of the initial sorted attribute lists associated with the root node 0 of the tree for the training data in FIG. 1 and the resulting partitioned lists for the two children (nodes 1 and 2).

To evaluate split points for the lists, serial SPRINT uses histograms to tabulate the class distributions of the records in an attribute list. Splits for a numeric attribute A are of the form {value(A)<x} where x is a value in the domain of A. Splits for a categorical attribute A are of the form {value(A) in X} where X is a subset of domain(A). The split test is chosen to "best" divide the training records associated with a node. Having found the winning split test for a node, the node's attribute lists are split into two to form the attribute lists for the child nodes (nodes 1–2 in FIG. 3). The attribute list for the winning attribute (Age in our example at the root node 0) is partitioned simply by scanning the list and applying the split test to each record. For the remaining "losing" attributes (Car Type in our example) more work is needed. While dividing the winning attribute, a probe structure (bit mask or hash table) on the tids is created, noting the child where a particular record belongs. While splitting other attribute lists, this structure is consulted for each record to determine the child where this record should be placed. If the probe structure is too big to fit in memory, the splitting takes multiple steps. In each step only a portion of the attribute lists are partitioned.

The serial SPRINT method was oriented to a single processor environment and does not take advantage of the resources in a shared-memory multiprocessor system in building the classifier.

A parallel version of SPRINT is described in the assignee's U.S. patent application for "Method and System for Generating a Decision-Tree Classifier In a Multi-Processor System," Ser. No. 08/641,404 (hereinafter parallel SPRINT application). Like other previous parallel classification methods, parallel SPRINT is primarily oriented to distributed-memory (or shared-nothing) parallel machines.

In such a machine, each processor has its own memory and local disks, and communicates with other processors only via passing messages. These methods require a significant amount of communication between the processors in order to evaluate a condition for splitting a tree node, thus limiting the number of possible tests that can be considered.

First, the training examples are distributed equally among all the processors. Each processor generates its own attribute list partitions in parallel by projecting each attribute from training examples it was assigned. FIG. 4 shows a typical partitioning of two attribute lists (for node 0 in FIG. 3) over two processors using parallel SPRINT. Each processor is responsible for splitting its own attribute-list partitions in the split phase. However, since different attribute lists belonging to a processor do not correspond to the same set of records, each processor needs to build a probe structure covering all the records in an attribute list. A processor accomplishes this by exchanging its own tids of the winning attribute list and their corresponding left/right labels with that of all other processors. For example, FIGS. 5 and 6 illustrate an example partitioning of two attribute lists over two processors corresponding to tree nodes 1 and 2, respectively (from FIG. 3) using parallel SPRINT.

The parallel SPRINT method would perform poorly on a shared-memory multiprocessor system because its distributed data structures must be updated for every node, causing much communication among the processors. Each processor would be responsible for processing a roughly 1/P fraction of each attribute list, where P is the number of processors in the system, and all processors synchronously construct one global decision tree, one node at a time. This, in effect, is like simulating a distributed-memory system on an SMP machine, with additional software for memory and disk management. An arbitrary partitioning of the SMP memory to run a distributed-memory algorithm would result in very inefficient use of the SMP memory. Several data structures must be unnecessarily replicated (e.g., probe structure). The communication software of the distributed-memory system will also need to be mapped into SMP communication primitives. Thus, this approach brings much complexity in programming a distributed-memory system without benefiting from any of its scalability advantages.

In parallel SPRINT, the processors simultaneously grow the same node of a tree by working in parallel on disjoint portions of the attribute list of a numeric attribute to find the best split point in their respective portions. While these portions start off being of equal size, as the tree grows and attribute lists are split, the sizes can start varying substantially resulting in a load imbalance. Performing dynamic load balancing to correct this imbalance is very complex and will introduce significant overhead.

Therefore, there remains a need for an efficient method for generating a decision tree classifier in parallel by the processors of a shared-memory multiprocessor system that is fast, compact, and scalable on large training sets.

SUMMARY OF THE INVENTION

It is an object of the present invention to provide a method for generating a decision-tree classifier in parallel by the processors of a shared-memory multiprocessor system, from a training set of records.

Another object of the invention is to provide a decision-tree classifier that is fast, compact, and scalable on large disk-resident training sets, without restricting the size of the training set to the system memory limit or introducing heavy communication among the processors.

Still another object of the invention is to provide a method for generating a decision-tree classifier in a shared-memory multiprocessor system in which the attribute lists are assigned and reassigned to the processors dynamically to obtain load balancing in the system.

The present invention achieves the foregoing and other objects by providing a method for generating a decision-tree classifier in a shared-memory multiprocessor system which takes advantage of the system resources for parallelizing the attribute data and processing them dynamically. Each record includes one or more attributes, a record ID, and information on the class to which the record belongs. The method dynamically assigns the attribute lists at each tree node (which are in the global memory) to the processors. The processors cooperatively generate a decision tree by repeatedly partitioning each attribute list into two sublists according to tuple classes. The attribute lists are derived from the training set and may be sorted on their numeric attributes to minimize processor synchronization overhead and processor idle time. Each tuple in an attribute list includes a value for that attribute, a class label, and a tuple ID (tid) of the record from which the attribute value is obtained.

Each processor computes, in parallel with other processors, the best split points for the attribute lists assigned to it. The processors then work together through the shared memory to determine a global best split for all the attributes. The attribute lists for the current node are reassigned to the processors where each processor splits its reassigned lists according to the global best split. The attribute lists resulting from the split become those for the child nodes of the current node. This process is repeated for each new child node, starting with the attribute assignment, until each attribute list of the newly created child nodes includes only tuples of the same class or includes a predetermined number of tuples. The final decision tree becomes the desired classifier in which the records associated with each leaf node are of the same class.

Another aspect of the invention is the dynamic assignment of disjoint subtrees of the decision tree to disjoint group of processors. Processors of a group which has finished its subtree are free to join another group of processors to reduce processor idle time and achieve better load balancing. Since the assignment of attributes to processors is dynamic, as soon as a processor becomes free, it proceeds with the next available attribute.

In a preferred embodiment of the invention, the attribute lists are sorted in parallel by the processors based on the value of the numeric attributes. Each processor first determines a split test to best separate tuples, for each attribute list assigned to it, by tuple classes. The processor shares its best split test with other processors to determine the best split test, over all attribute lists, for the examined node. The processor then partitions the tuples in each attribute list reassigned to it at the examined node, according to the best split test for the examined node. The partitions of attribute lists form the child nodes of the examined node and also become new leaf nodes of the tree. The attribute lists of the new leaf nodes are then split in a similar fashion. Preferably, the split tests are determined based on a splitting index corresponding to the criterion used in splitting the records.

In addition, each processor maintains for each attribute one or more variables, such as histograms, representing the distribution of the records at each leaf node. In determining a split test, the processor would traverse the attribute list for each attribute A and update the class histograms for A at the examined node using the class label. If A is a numeric attribute, then the splitting index for a splitting criterion for the examined node is calculated. If A is categorical, then one of the processors collects all the class histograms for A from other processors after the scan and determines a subset of the attribute A that results in the highest splitting index for the examined node. The splitting index used is preferably a gini-index based on the relative frequency of records from each class present in the training set.

In another aspect of the invention, the originally created decision tree is pruned based on the MDL principle to obtain a more compact classifier. The original tree and split tests are first encoded in a MDL-based code. The code length for each node of the tree is calculated. Depending on the code lengths resulting from different pruning options at the node, the method determines whether to prune the node, and if so, how to prune it.

Additional objects and advantages of the present invention will be set forth in the description which follows, and in part will be obvious from the description and with the accompanying drawing, or may be learned from the practice of this invention.

BRIEF DESCRIPTION OF THE DRAWINGS

FIGS. 11–13 illustrate a partitioning of two attribute lists over two processors corresponding to nodes 0, 1, and 2 of a tree, respectively, in accordance with the invention.

FIG. 14 shows typical pseudo-code for a BASIC preferred embodiment of the invention.

FIG. 16 shows typical pseudo-code for a Fixed-Window-K (FWK) preferred embodiment of the invention.

FIG. 19 shows typical pseudo-code for a Moving-Window-K (MWK) preferred embodiment of the invention.

FIG. 21 shows typical pseudo-code for a SUBTREE preferred embodiment of the invention.

DESCRIPTION OF THE PREFERRED EMBODIMENT

The invention will be described primarily as a method for generating a decision-tree classifier in parallel in a shared-memory multiprocessor system, or a shared-memory software layer built on top of a distributed-memory multiprocessor system. For example, the system may be an IBM SP2 which consists of up to 64 high nodes, where each high node is an 8-way SMP system with PowerPC 604e processors.

Persons skilled in the art will recognize that an apparatus, such as a data processing system, including a CPU, memory, I/O, program storage, a connecting bus, and other appropriate components, could be programmed or otherwise designed to facilitate the practice of the method of the invention. Such a system would include appropriate program means for executing the method of the invention.

Also, an article of manufacture, such as a prerecorded disk or other similar computer program product, for use with a data processing system, could include a storage medium and program means recorded thereon for directing the data processing system to facilitate the practice of the method of the invention. Such apparatus and articles of manufacture also fall within the spirit and scope of the invention.

SHARED-MEMORY MULTIPROCESSOR SYSTEM (SMP)

Shared-memory multiprocessor systems are parallel computers having a global memory unit shared by the processors in the systems. They are also referred to as symmetric multiprocessor systems or shared-everything systems. SMP machines are the dominant type of parallel systems currently used in industry because they are easier to program than the parallel distributed-memory machines, and deliver high performance at an attractive price. A shared-memory system has a single memory address space that all processors can access. The processors communicate through shared variables in memory and are capable of accessing any memory location. Any processor can access any disk attached to the system. Synchronization is typically used to coordinate processes.

Figure 7:
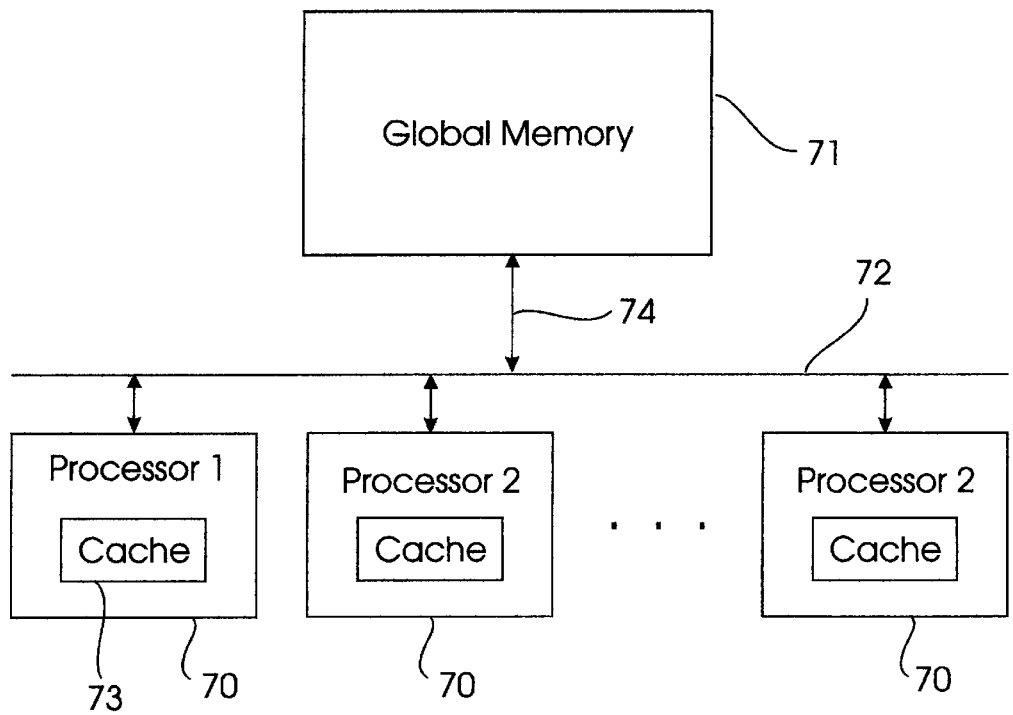
FIG. 7 is a block diagram of a computer system having multiple processors and a shared memory in which the present invention may be practiced.

FIG. 7 is a simplified block diagram of a shared-memory multiprocessor system in which the method of the invention may be practiced. The system includes several processors 70 that share a global memory 71 through one or more fast memory (or system) bus 72. Each processor typically has L1 (level 1) and L2 (level 2) data caches and instruction caches 73. The global memory 71 may consist of one or more memory modules connected to the memory bus through one or more memory port 74. Each processor can access any part of the global memory. Each processor 70 may be implemented in hardware, software, or a combination thereof. For instance, the processors 70 may be a processor within an IBM SMP system, or software tasks of a multitask program running on a single processor. Similarly, the bus 72 may be implemented in hardware, software, or a combination thereof.

In the preferred embodiments of the invention, the POSIX thread (pthread) standard are used. The POSIX threads are described, for example, in a book entitled "Threads Primer" by Bill Lewis and Daniel J. Berg, published by Prentice Hall, 1996. A thread is a light weight process. It is a schedulable entity that has only those properties that are required to ensure its independent flow of control, including the stack, scheduling properties, set of pending and blocking signals, and some thread-specific data. To simplify the present description, threads and processes will not be differentiated and it will be assumed that there is only one process per processor.

DECISION-TREE CLASSIFIER

Figures 1, 2:
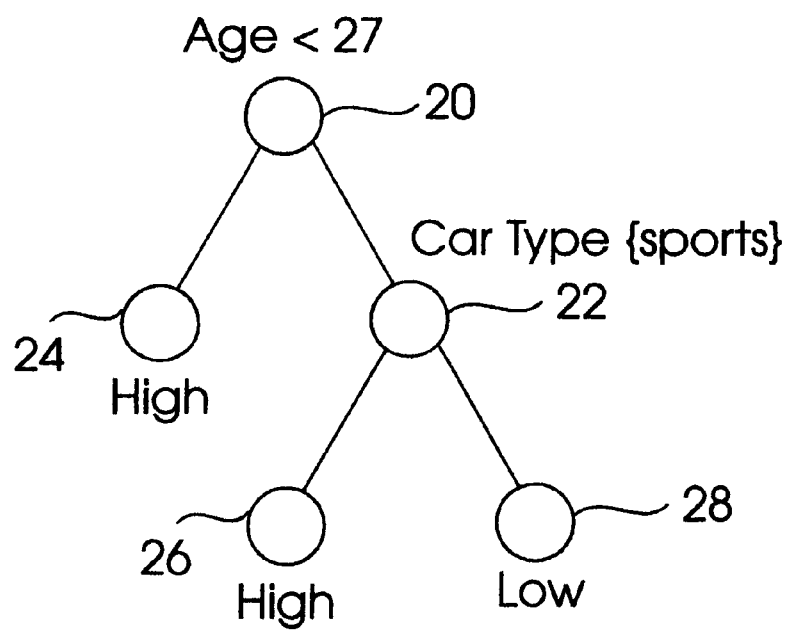
FIG. 1 shows an example of a prior art training set of records.
FIG. 2 illustrates a prior art decision tree corresponding to the training set of FIG. 1 in which each leaf node represents a class of records.
Figure 3:
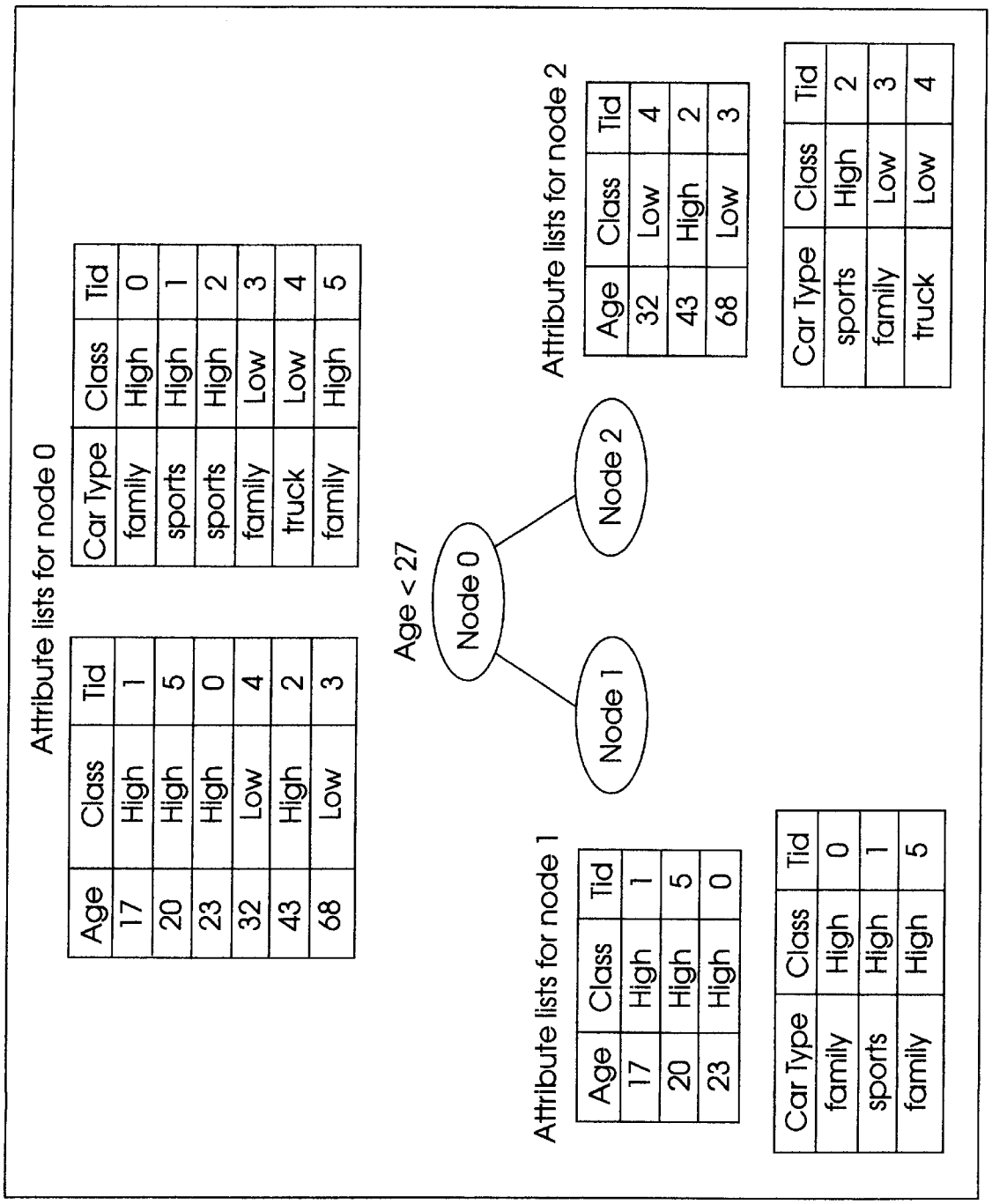
FIG. 3 shows the relationship between the attribute lists and the tree nodes of FIG. 2.
Figure 4:
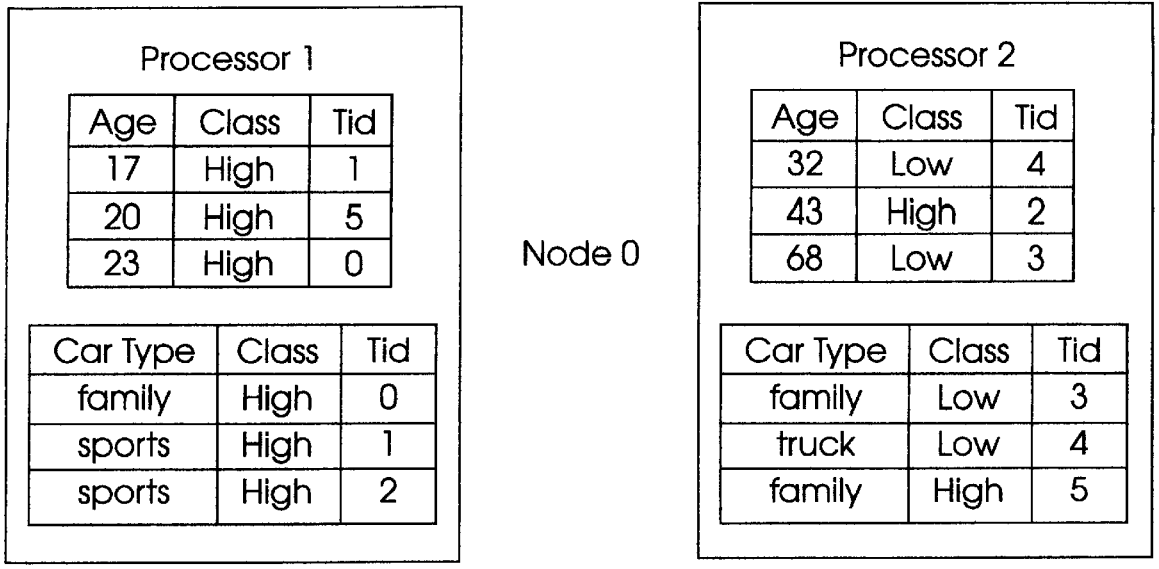
FIGS. 4–6 illustrate a partitioning of two attribute lists over two processors corresponding to nodes 0, 1, and 2 of a tree, respectively, using the prior art parallel SPRINT method.
Figure 5:
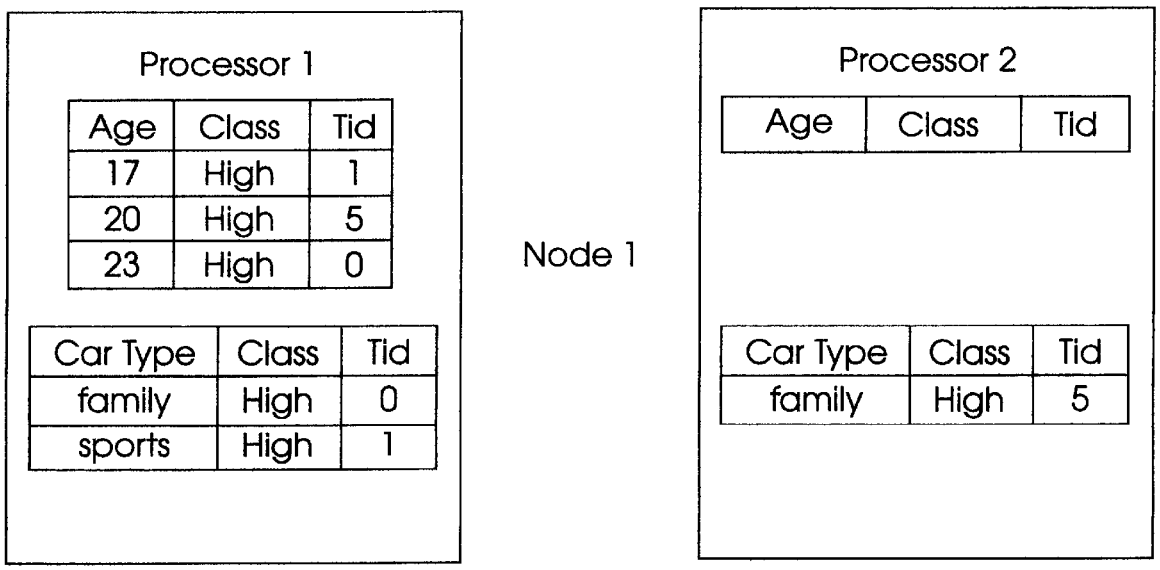
Figure 6:
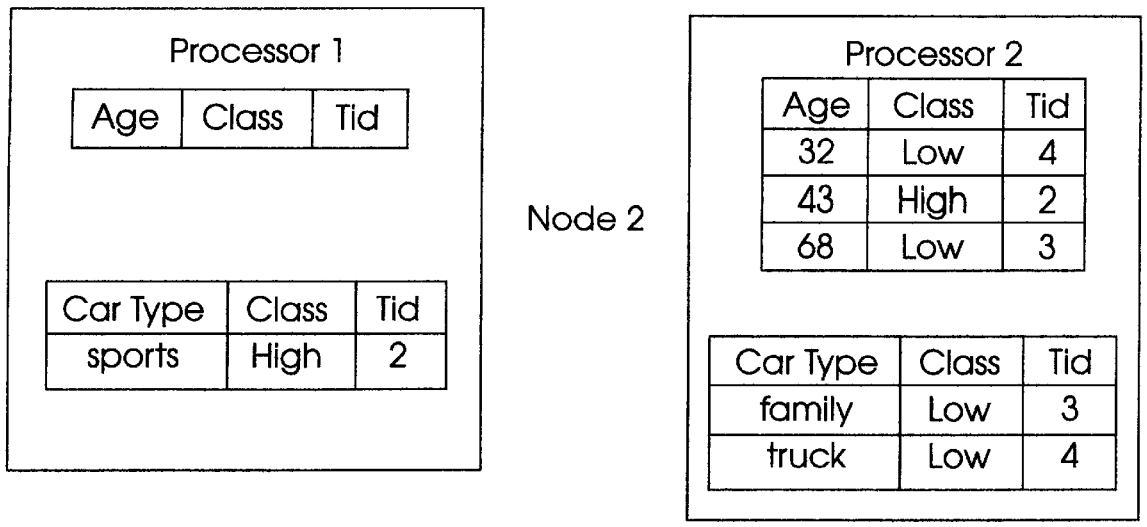

A decision tree contains tree-structured nodes. Each node is either a leaf, indicating a class, or a decision node, specifying some test on one or more attributes, with one branch or subtree for each of the possible outcomes of the split test. Decision trees successively divide the set of training examples until all the subsets consist of data belonging entirely, or predominantly, to a single class. FIG. 2 shows a decision-tree classifier developed from the training set of FIG. 1.

A decision-tree classifier is usually built in two phases: a growth phase and a prune phase. The tree is grown using a divide and conquer approach. Given a set of training examples S as input, there are two cases to consider. If all examples in S, entirely or predominantly (a user specified parameter), belong to a single class, then S becomes a leaf. On the other hand, if S contains a mixture of examples from different classes, the input is partitioned into subsets that tend towards a single class. The partitioning is based on a test on an attribute. The splits are usually binary as they lead to more accurate trees. The above process is recursively applied using the partitioned datasets as inputs.

The tree thus built can "over fit" the data. The goal of classification is to predict new unseen cases. The prune phase generalizes the tree by removing subtrees corresponding to statistical noise or variation that may be particular only to the training data. This phase requires access only to the fully grown tree, while the tree growth phase usually requires multiple passes over the training data, and as such is much more expensive. Previous studies of the SLIQ method indicate that usually less than 1% of the total time needed to build a classifier was spent in the prune phase.

The performance of the tree growth phase depends on two factors: (i) how to find split points that define node tests, and (ii) having chosen a split point, how to partition the data. The computations in the method of generating a decision-tree classifier, according to the invention, are parallelized in four different ways resulting in four different preferred embodiments.

Figure 8:
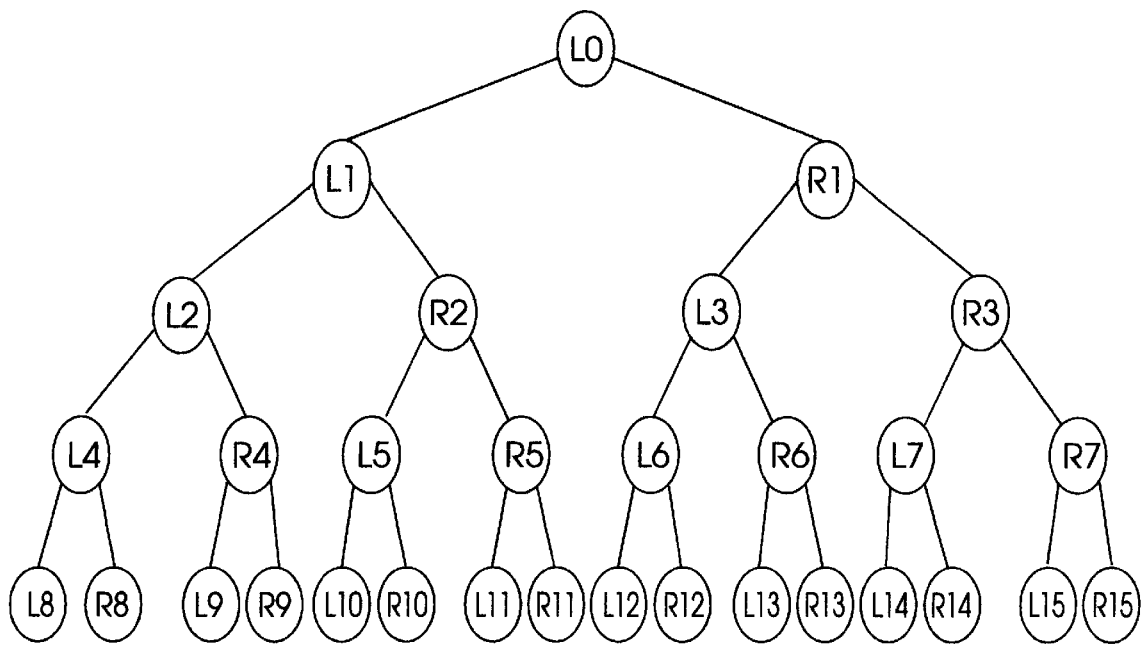
FIG. 8 illustrates a prior art mapping of the attribute lists of each node to physical files.
Figure 9:
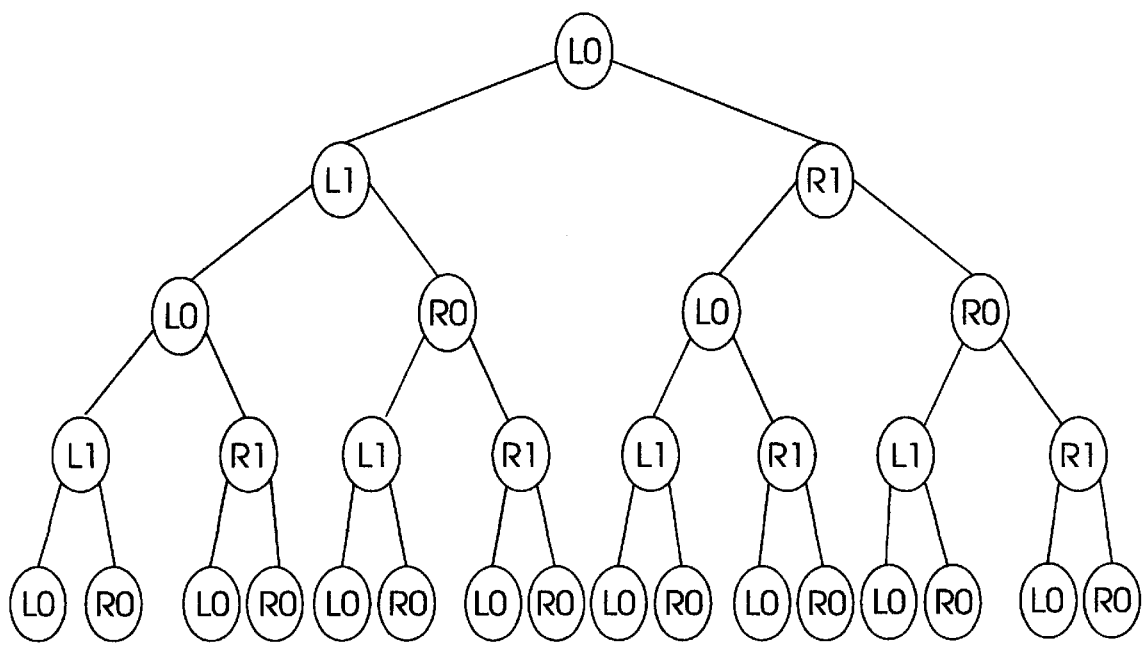
FIG. 9 illustrates a mapping of the attribute lists for each node to physical files, in accordance with the invention.

The attribute lists of each attribute are stored in disk files. As the tree is split, new files are to be created for the children, and the files for the parent node deleted. Rather than creating a physical file for each attribute for every node, a total of only four physical files per attribute are needed. Since the splits are binary, there is one attribute file for all leaves that are "left" children and one file for all leaves that are "right" children. There are two more files per attribute that serve as alternates. FIG. 8 illustrates a prior art mapping of the attribute lists for each node to physical files, with L0–L15 and R0–R15 represent the attribute files for left child nodes and right child nodes, respectively. A total of 32 files are needed in this case. FIG. 9 illustrates a mapping of the attribute lists for each node to physical files, in accordance with the invention. Note that only four attribute files (L0–L1, R0–R1) are needed in the global memory, which are reused when the nodes are splitting. In fact, it is even possible to combine the records of different attribute lists into one physical file, thus requiring a total of 4 physical files over all attributes.

PARALLEL CLASSIFICATION ON SHARED-MEMORY SYSTEMS

The method for generating a decision-tree classifier in parallel in an SMP system is now described. Here, only the tree growth phase, and not the pruning phase, is described in detail due to its computation and data-intensive nature. For a description of the tree-pruning phase, see, for example, the assignee's pending U.S. patent application for "Method and System for Generating a Decision-Tree Classifier In a Multi-Processor System," Ser. No. 08/641,404.

In building any decision-tree, there are generally three main tasks that must be performed for each node at each level of the tree: (i) evaluate split points for each attribute (denoted as phase E); (ii) find the winning split-point and construct a probe structure using the attribute list of the winning attribute (denoted as phase W); and (iii) split all the attribute lists into two parts, one for each child, using the probe structure (denoted as phase S). The method of the invention will be described in terms of these phases.

There are two approaches to building a classifier in parallel: a DATA-PARALLEL approach and a TASK-PARALLEL approach. In the DATA-PARALLEL approach, the P processors in the system work on distinct portions of the datasets and synchronously construct the global decision tree. This approach exploits the intra-node parallelism that is available for building each decision tree node. Data parallelism may be based on the data RECORDS or the ATTRIBUTES of the records. In RECORD DATA PARALLELISM, the records in each attribute lists are partitioned into P portions where each portion is assigned to a distinct processor. This method, while feasible on a distributed-memory parallel system, is not well-suited for an SMP system for the reasons similar to those discussed in the background section.

ATTRIBUTE DATA PARALLELISM, which is the main part of the invention, will be described in detail below in reference to the BASIC, Fixed-Window-K (FWK), and Moving-Window-K (MWK) preferred embodiments of the invention.

The second approach, TASK PARALLELISM, exploits the inter-node parallelism: different portions of the decision tree are built in parallel among the processors. This approach is equally well suited for an SMP system and can achieve dynamic load balancing easily without much overhead. It will be described below in detail as the SUBTREE preferred embodiment.

Figure 10:
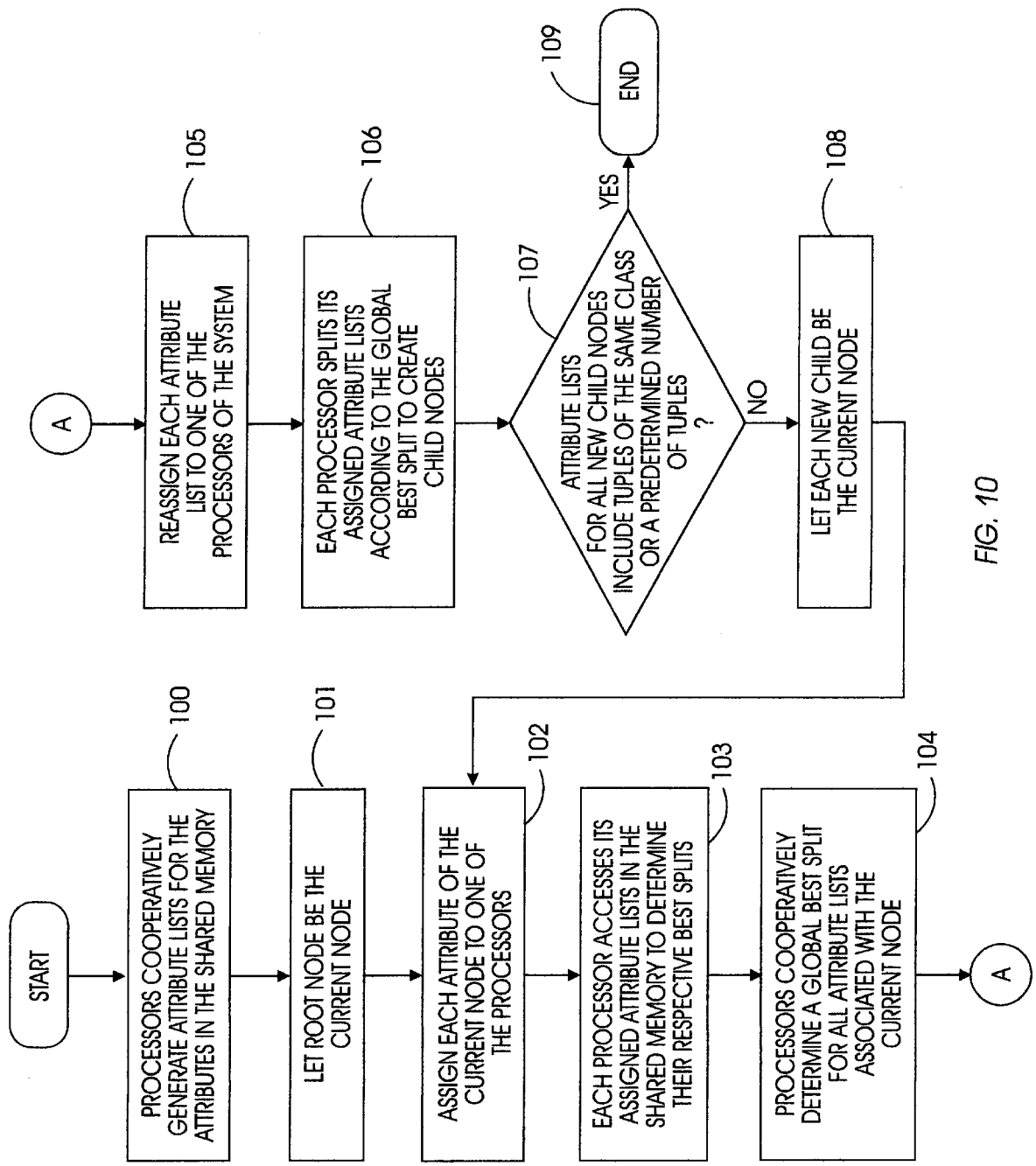
FIG. 10 is a flowchart representing the operation of the method of generating a decision-tree classifier in a shared-memory multiprocessor system, in accordance with the invention.

FIG. 10 is a flowchart representing the operational steps of the method of the invention. At step 100, the processors cooperatively generate an attribute list for each attribute, where the d generated attribute lists reside in the global memory shared by the processors. Let the root node of the decision-tree classifier be the current node (step 101). At step 102, the attribute lists associated with the current node are assigned to the processors where each processor may have more than one list, but no two processors are assigned the same list. If there are more processors than attribute lists (P>d), some processors will have no lists to process initially. Note that the attribute lists are assigned among the processors, without partitioning the records in each attribute list, so that the P processors collectively finish the work associated with the d attribute lists at about the same time. The assignment of the d attribute lists to processors is dynamic, i.e., as soon as a processor becomes free, it grabs the next available attribute lists, thus simplifying load balancing.

At step 103, each processor accesses its assigned attribute lists in the shared memory to determine a best split for each assigned attribute list. The processor has to access each attribute list assigned to it only once in determining the best splits for all the tree nodes at the same level of the tree (before the nodes are split and the lists reassigned). The best split for each attribute list can be determined using a split index based on a Gini index described in the assignee's pending U.S. patent application for "Method and System for Generating a Decision-Tree Classifier In a Multi-Processor System," Ser. No. 08/641,404.

Using the attribute lists in the shared memory, the processors cooperatively determine a global best split for all of the attribute lists of the current node, in step 104. Each attribute list in the shared memory is next reassigned to one of the P processors in the system in step 105. Similar to the previous assignment, this reassignment is preferably dynamic. In step 106, each processor splits its reassigned attribute lists of the current node according to the determined global best split. The two attribute lists resulting from each list being split now become the attribute lists for the left and right child nodes of the current node, respectively. Note that each processor needs to access its reassigned lists in the global memory only once in splitting the lists for all the nodes at the same level of the tree.

At step 107, the attribute lists for the newly created child nodes are examined to determine whether their entries (referred to as tuples) are of the same record class or whether each includes no more than a predetermined number of entries. If the condition is not met, each new child node becomes the current node (step 108) and the method steps are repeated starting with step 102. If this condition is met, the tree growing phase terminates at step 109.

ATTRIBUTE DATA PARALLELISM

Three preferred embodiments for the ATTRIBUTE DATA PARALLELISM approach, BASIC, Fixed-Window-K, and Moving-Window-K, are now described. They all use DYNAMIC, rather than STATIC attribute scheduling. In a STATIC attribute scheduling, each process gets d/P attributes where d and P denote the number of attributes and processors, respectively. However, this static partitioning is not particularly suited for classification. Different attributes may have different processing costs because of two reasons. First, there are two kinds of attributes, numeric and categorical, and they use different techniques to arrive at split tests. Second, even for attributes of the same type, the split computation depends on the distribution of the record values. For example, the cardinality of the value set of a categorical attribute determines the cost of gini index evaluation. These factors warrant a dynamic attribute scheduling approach.

FIGS. 11-13 show an example of attribute data parallelism, in which different attribute lists are assigned to different processors at tree nodes 0, 1, and 2, respectively. In this example, the attribute list of Age is assigned to processor 1 and the attribute list of Car Type is assigned to processor 2. Note that, unlike the parallel SPRINT method, the records of the same attribute list are never partitioned into different processors.

1. BASIC

FIG. 14 shows the pseudo-code for the BASIC preferred embodiment of the invention. A barrier represents a point of synchronization among the processors. While a full tree is typically developed, the tree generally may have a sparse irregular structure. At each level, a processor evaluates the assigned attributes, which is followed by a barrier.

Attributes are scheduled dynamically by using an attribute counter and locking. A processor acquires the lock, grabs an attribute, increments the counter, and releases the lock. This method achieves the same effect as the self-scheduling method described in "Processor Self-scheduling For Multiple Nested Parallel Loops" by P. Tang and P. C. Yew, International Conference on Parallel Processing, August 1996. That is, there is a lock synchronization for each attribute. For typical classification problems with up to a few hundred attributes, this dynamic assignment of attributes into processors works fine. However, for thousands of attributes, it may generate too much unnecessary synchronization. In that case, one can use a guided self-scheduling or its extensions to minimize the synchronization, where each processor grabs a dynamically shrinking chunk of remaining attributes. See, for example, "Guided Self-scheduling: A Practical Scheduling Scheme For Parallel Supercomputers" by C. D. Polychronopoulos and D. J. Kuck, IEEE Transactions on Computers, C-36(12), pp. 1425–1439, December 1987. It is evident to people skilled in the art that any dynamic scheduling of assigning d attribute lists to P processors with good load balance and small overhead can be applied.

Figure 15:
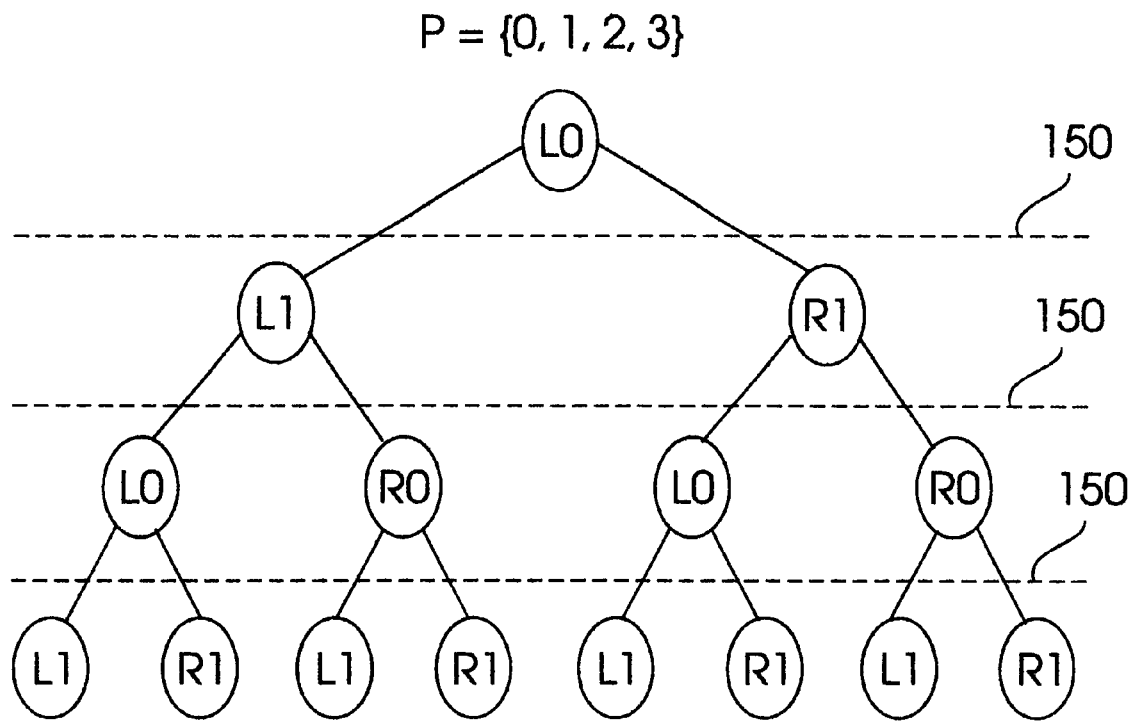
FIG. 15 shows a pictorial view of a synchronization on a decision tree using the BASIC preferred embodiment.

Since each attribute has its own set of four reusable attribute files, as long as no two processors work on the same attribute at the same time, there is no need for file access synchronization. To minimize barrier synchronization the tree is built in a breadth-first manner. FIG. 15 shows the barrier synchronization required per level of the decision tree developed by a 4-processor SMP system. Each line 150 represents a barrier. The advantage here is that once a processor has been assigned an attribute, it can evaluate the split points for that attribute for all the leaves in the current level. This way, each attribute list is accessed only once sequentially during the evaluation for a level. Once all attributes have been processed in this fashion, a single barrier ensures that all processors have reached the end of the attribute evaluation phase. In contrast, depth-first tree growth would require a barrier synchronization once per leaf, which could become a significant source of overhead in large trees.

As each processor works independently on the entire attribute list, they can independently carry out gini index evaluation to determine the best split point for each assigned attribute list.

Once all the attributes of a leaf node have been processed, each processor will have what it considers to be the best split for that node. The processors then work together in finding a global best split from among their local best splits. The winning attribute's records are then scanned to form a hash probe. The purpose of the hash probe is to record, for each tuple ID in the attribute list, whether this record type should be assigned to a left child or a right child during the split. While this information is obvious from the winning attribute (it is recorded by the winning attribute), all other "losing" attributes need this information to determine the left-or-right assignment.

The breadth-first tree construction imposes some constraints on the hash probe construction. This can be remedied by separating the hash tables for each leaf. If there is insufficient memory to hold these hash tables in memory, they would have to be written to disk. The size of each leaf's hash table can be reduced by keeping only the smaller child's tids (tuple ids), since the other records must necessarily belong to the other child. Another option is to maintain a global bit probe for all the current leaves. It has as many bits as there are tuples in the training set. As the records for each leaf's winning attribute are processed, the corresponding bit is set to reflect whether the record should be written to a left or right file. A third approach is to maintain an index of valid tids of a leaf, and relabel them starting from zero. Then each leaf can keep a separate bit probe.

In the BASIC approach, both the tasks of finding the minimum split value and bit probe construction are performed serially by a pre-designated master processor. This step thus represents a potential bottleneck, which will be eliminated in the MWK embodiment to be described later. During the time the master computes the hash probe, the other processors enter a barrier and go to sleep. Once the master finishes, it also enters the barrier and wakes up the sleeping processors, setting the stage for the splitting phase.

The attribute list splitting phase proceeds in the same manner as the evaluation. A processor dynamically grabs an attribute, scans its records, hashes on the tid for the child node, and performs the split. Since the files for each attribute are distinct, there is no read/write conflict among the different processors.

2. FIXED-WINDOW-K(FWK)

The Fixed-Window-K(FWK) process, represented by the pseudo-code of FIG. 16, addresses the potential sequential bottleneck during the winning attribute hash probe construction phase of BASIC. The main idea here is to overlap the hash probe construction (W-phase) with the evaluation of the splits (E-phase) of the next leaf at the current level, thus realizing pipelining. The degree of overlap can be controlled by a parameter K denoting the window of current overlapped leaves. Let $E(i)$, $W(i)$, and $S(i)$ denote the evaluation, winning hash construction, and partition steps for leaf i at a given level of the tree. Then, for K=2, W(0) and E(1) overlap with each other. For K=3, W(0) overlaps with $\{E(1), E(2)\}$, and W(1) overlaps with E(2). For a general K, W(i) overlaps with $\{E(i+1), \ldots, E(K-1)\}$, for all $1 \leq i \leq K-1$. The attribute scheduling, split finding, and partitioning steps remain the same. As a result, depending on the window size K, K leaf nodes are grouped together. For each leaf within the K-block (i.e., K leaves of the same group), all attributes are first evaluated.

Figure 17:
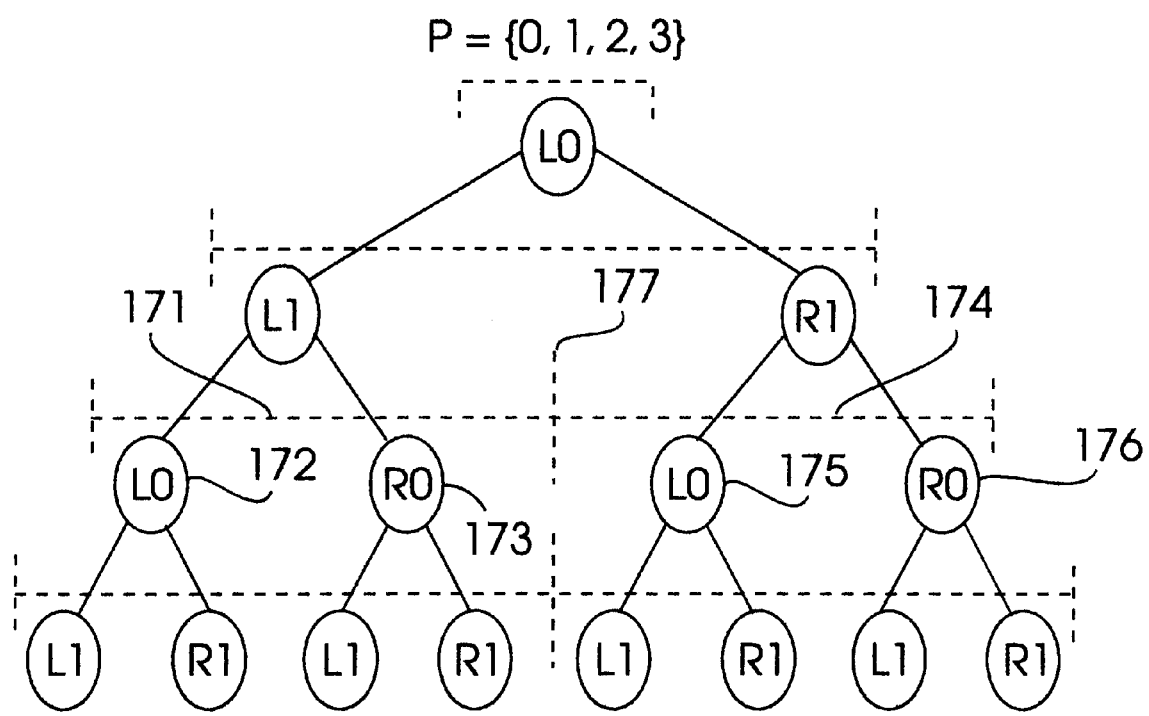
FIG. 17 illustrates a pictorial view of the synchronization on a decision tree using the FWK preferred embodiment, with the window K equal to 2.

At the last leaf in each block, a barrier synchronization is performed to ensure that all evaluations for the current block have completed. The hash probe for a leaf is constructed by the last processor to exit the evaluation for that leaf. This ensures that no two processors access the hash probe at the same time. FIG. 17 shows an example of the FWK embodiment in a four-processor SMP system with the window K=2. In this decision tree, every K=2 leaves are grouped together and the groups are separated by barrier synchronizations as in the fixed window case. For example, group 171 includes nodes 172 and 173 while group 174 includes nodes 175 and 176. Groups 171 and 174 are separated by a barrier 177.

There are four reusable files per attribute in the BASIC preferred embodiment.

However, if the hash probe construction step is allowed to overlap with the evaluation step (which uses dynamic attribute scheduling within each leaf), K distinct files would be required for the current level, and K files for the parent node's attribute lists. That is, 2K files per attribute are needed. Since all K leaves in a group have separate files for each attribute, there is no read/write conflict. Another complication arises from the fact that some children may turn out to be pure (i.e., all records belong to the same class) at the next level. Since these children will not be processed after the next stage, the file assignment for them must be examined.

Figure 18:
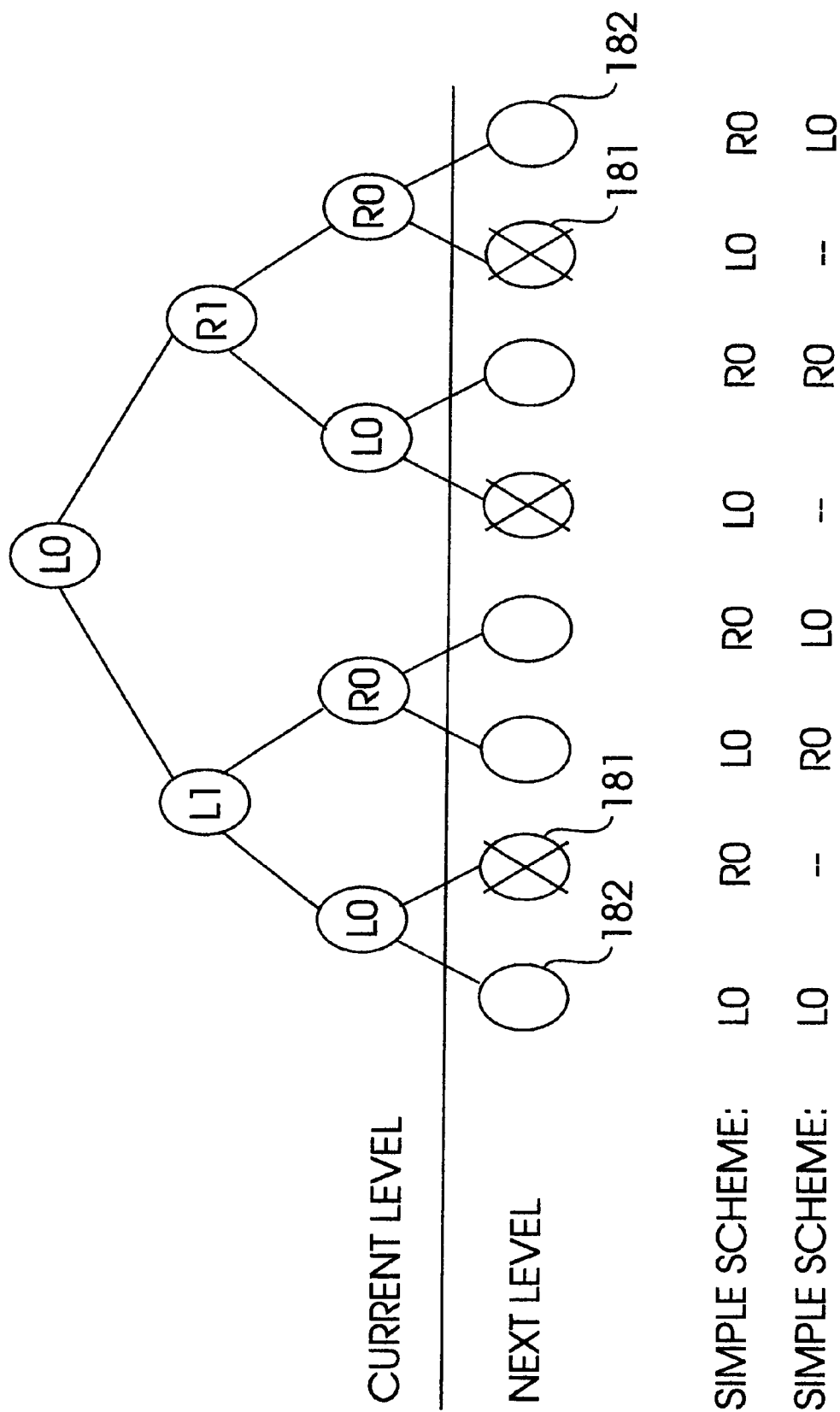
FIG. 18 illustrates a pictorial view of a relabel process for assigning leaves to files for minimizing the processor idle time, in accordance with the invention, as compared to a prior art process.

A simple file assignment, without considering the child purity and where child nodes are assigned files from 0 to K−1, will not work well because it may introduce "holes" in the schedule. FIG. 18 shows a tree with this simple assignment scheme resulting in holes 181 in the sequence L0, L0, R0, R0, R0. A hole 181 indicates a child node that need not be split further because it includes tuples of the same class or no more than a target number of tuples (step 107 of FIG. 10). Intuitively, the child node is either pure or sufficiently small. As can be seen, the window of size K=2 containing (L0, R0) has been reduced to size K=1 containing only L0 or R0 in many places of the same sequence, i.e., (L0), (L0, R0), (R0), (R0).

A solution to the scheduling problem of the simple assignment scheme is to add a pretest for child purity at this stage, referred to as re-labeling. If the child will become pure at the next level, it is removed from the list of valid children, and the files are assigned consecutively among the remaining children. This insures that there are no holes in the K-block, resulting in a perfect scheduling. FIG. 18 shows the effects of re-labeling where circles 182 represent the valid child nodes for the current and next level. Using the simple assignment above, the file labels for the valid children are L0, L0, R0, R0, R0. With a window of size K=2, there is only one instance where work can overlap, i.e., when going from L0 to R0. However, if the valid children's files are re-labeled, then the perfectly schedulable sequence L0, R0, L0, R0, L0 is obtained.

Note that the overlapping of work is achieved at the cost of increased barrier synchronization, one per each K-block: A large window size not only increases the overlap but also minimizes the number of synchronizations. However, a larger window size implies more temporary files, which incurs greater file creation overhead and tends to have less locality. The ideal window size is a tradeoff between the above conflicting goals.

3. MOVING-WINDOW-K(MWK)

The Moving-Window-K(MWK) approach eliminates the serial bottleneck of BASIC and exploits greater parallelism than Fixed-Window-K (FWK). FIG. 19 shows the pseudo-code for a typical implementation of MWK.

Consider a current leaf frontier: {L0', R0', L0'', R0''}. With a window size of K=2, not only is there parallelism available for fixed blocks {L0', R0'} and {L0'', R0''} (used in FWK), but also between these two blocks, {R0', L0''}. The MWK process makes use of this additional parallelism. It replaces the barrier per block of K leaves with a WAIT on a CONDITIONAL VARIABLE. Before evaluating leaf i, a processor determines whether the i-th leaf of the previous block has been processed. If not, the processor goes to sleep on the conditional variable. Otherwise, it proceeds with the current leaf. The last processor to finish the evaluation of leaf from the previous block constructs the hash probe, and then signals the conditional variable, so that any sleeping processors are woken up.

Figure 20:
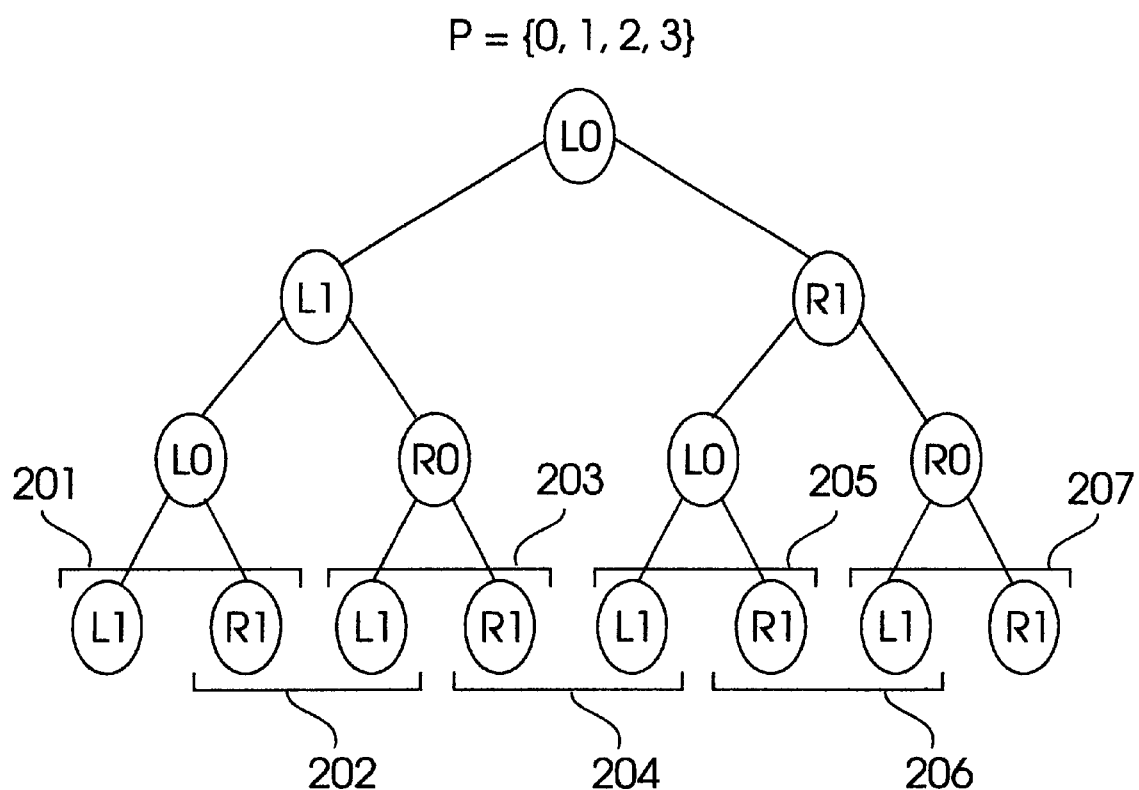
FIG. 20 is a pictorial view of a synchronization on a decision tree constructed with the MWK preferred embodiment.

FIG. 20 illustrates an example of the MWK embodiment in a four-processor SMP system with K=2. In the decision tree, every K=2 leaves are grouped together as a size-2 window. However, unlike the fixed windows in FWK, these windows are not fixed in the sense that they can move because they are guarded by conditional variable, not barrier synchronization. That is, there is no processor idle time due to the busy-wait in the barrier synchronization. A moving window is shown in its current state 201 and its other states 202–207.

The gain in available parallelism comes at the cost of increased lock synchronization per leaf (however, there is no barrier anymore). As in the FWK approach, the files are relabel by eliminating the pure children. A larger K value would increase parallelism, and while the number of synchronizations remain about the same, it will reduce the average waiting time on the conditional variable. Like FWK, this process requires 2K files per attribute, so that each of the K leaves has separate files for each attribute and there is no read/write conflict.

SUBTREE (TASK-PARALLELISM)

The above data parallel approaches target the parallelism available among the different attributes. On the other hand the task parallel approach is based on the parallelism that exists in different sub-trees. Once the attribute lists are partitioned, each child can be processed in parallel. One implementation of this idea would be to initially assign all the processors to the tree root, and recursively partition the processor sets along with the attribute lists. Once a processor gains control of a subtree, it will work only on that portion of the tree. This approach would work fine if we have a full tree. In general, the decision trees are imbalanced and this static partitioning scheme can suffer from large load imbalances. A DYNAMIC subtree task parallelism is therefore a preferred embodiment.

The typical pseudo-code for the dynamic SUBTREE process is shown in FIG. 21. To implement dynamic processor assignment to different subtrees, a queue of currently idle processors is maintained, called the FREE queue. Initially this queue is empty. All processors are assigned to the root of the decision tree and belong to a single group. One processor within the group is made the group master (the processor with the smallest identifier chosen as the master). The master is responsible for partitioning the processor set.

At any given point in the operation of SUBTREE, there may be multiple processor groups working on distinct subtrees. Each group independently executes the following steps once the BASIC process has been applied to the current subtree level. First, a new subtree leaf frontier is constructed. If there are no children remaining, then each processor inserts itself in the FREE queue, ensuring mutually exclusive access via locking. If there is more work to be done, then all processors except the master go to sleep on a conditional variable. The group master checks if there are any new arrivals in the FREE queue and grabs all free processors in the queue. This forms the new processor set.

There are three possible cases at this juncture. If there is only one leaf remaining, then all processors are assigned to that leaf. If there is only processor in the previous group and there is no processor in the FREE queue, then it forms a group on its own and works on the current leaf frontier. Lastly, if there are multiple leaves and multiple processors, the group master splits the processor set into two parts, and also splits the leaves into two parts. The two newly formed processor sets become the new groups, and work on the corresponding leaf sets.

Finally, the master wakes up all the relevant processors, i.e., those in the original group and those acquired from the FREE queue. Since there are P processors, there can be at most P groups. Also, since the attribute files for all of these must be distinct, this process requires up to 4P files per attribute.

Figure 22:
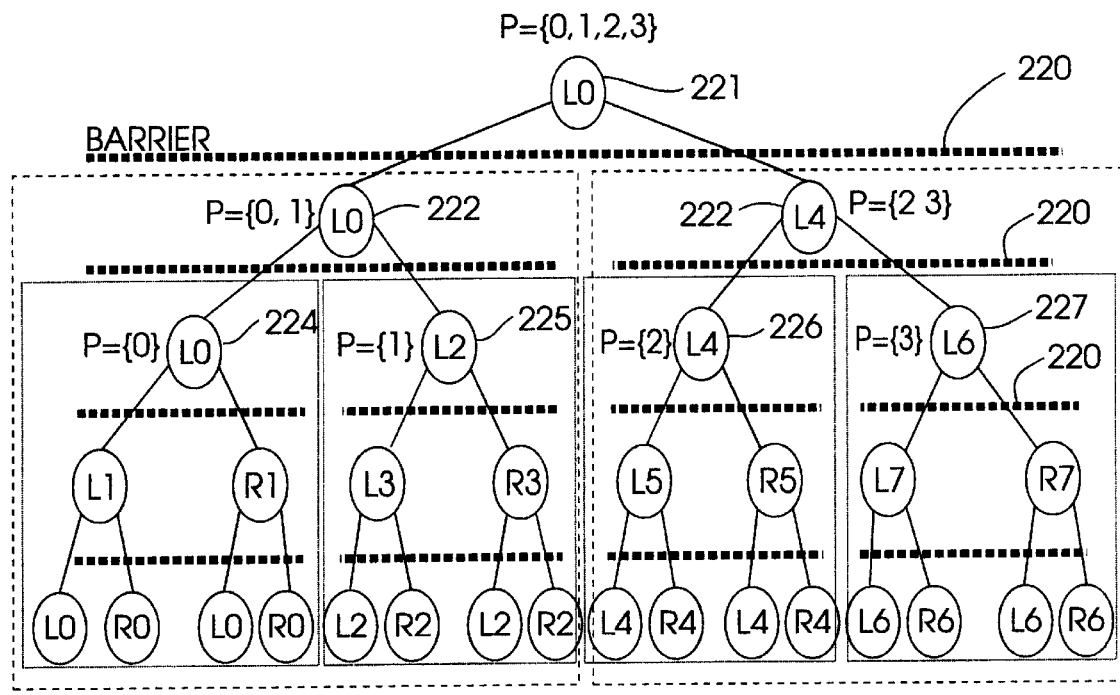
FIG. 22 is a pictorial view of the synchronization on a decision tree constructed using the SUBTREE preferred embodiment.

FIG. 22 is a pictorial view of the synchronization on a decision tree constructed using SUBTREE with four processors (P=4). Each line 220 represents a synchronization barrier. Initially, all four processors are cooperatively working on the root node 221. After the root node is split into left child 222 and right child 223, processors 0 and 1 work on the left child 222 while processors 2 and 3 work on the right child 223. Then, as the child nodes 222 and 223 are split further into their child nodes 224–227, each processor will work on a child node by itself.

A COMPARISON OF BASIC, FWK, and MWK

The MWK process eliminates the hash-probe construction bottleneck of BASIC via task pipelining. Furthermore, it fully exploits the available parallelism via the moving window mechanism, instead of using the fixed window approach of FWK. It also eliminates barrier synchronization completely. However, it introduces a lock synchronization per leaf per level. If the tree is bushy, then the increased synchronization could affect the other benefits. A feature of MWK and FWK is that they exploit parallelism at a finer grain. The attributes in a K-block may be scheduled dynamically on any processor. This can have the effect of better load balancing compared to the coarser grained BASIC approach where a processor works on all the leaves for a given attribute.

While MWK is essentially a data parallel approach, it utilizes some elements of task parallelism in the pipelining of the evaluation and hash probe construction stages. The SUBTREE approach is also a hybrid approach in that it uses the BASIC scheme within each group. In fact, FWK and MWK can also be used as part of SUBTREE. The advantages of SUBTREE are that it has only one barrier synchronization per level within each group and it has good processor utilization. As soon as a processor becomes idle it is likely to be grabbed by some active group. An disadvantage of SUBTREE is that it is sensitive to the tree structure and may lead to excessive synchronization for the FREE queue, due to rapidly changing groups. Another disadvantage is that it requires more memory, because each group of nodes needs a separate hash probe.

Although the methods of the invention can generate a large number of temporary files (2Kd for MWK and 4dP for SUBTREE), it is possible to implement them so that the lists for different attributes are combined into a same physical file. Such a design will reduce the number of temporary files to 2K for MWK and 4P for SUBTREE. The essential idea is to associate physical files for writing attribute lists with processor (rather than with attribute). In the split phase, a processor now writes all attribute lists to the same two physical files (for the left and right children). Additional bookkeeping data structures keep track of the start and end of different attribute lists in the tile. These data structures are shared at the next tree level by all processors to locate the input attribute list for each dynamically assigned attribute. This implementation does not incur additional synchronization overhead because a processor starts processing a new attribute list only after completely processing the one on hand.

PRUNING THE DECISION TREE

In order to obtain a more compact classifier, the decision tree generated using the just described process may further be pruned to remove extraneous nodes. Preferably, the pruning step is based on the Minimum Description Length (MDL) principle so that a subset of the child nodes at each node may be discarded without over-pruning the tree. The MDL principle generally states that the best model for encoding data is one that minimizes the sum of the cost of describing the data in terms of the model and the cost of describing the model. If M is a model that encodes data D, the total cost of encoding, cost(M, D), is defined as:

$$\text{cost}(M, D) = \text{cost}(D|M) + \text{cost}(M)$$

where the cost of encoding X, cost(X), is defined as the number of bits required to encode X. Here, the models are the set of trees obtained by pruning the original decision tree T, and the data is the training set S. Since the cost of encoding the data is relatively low, the objective of MDL pruning will be to find a subtree of T that best describes the training set S.

Figure 23:
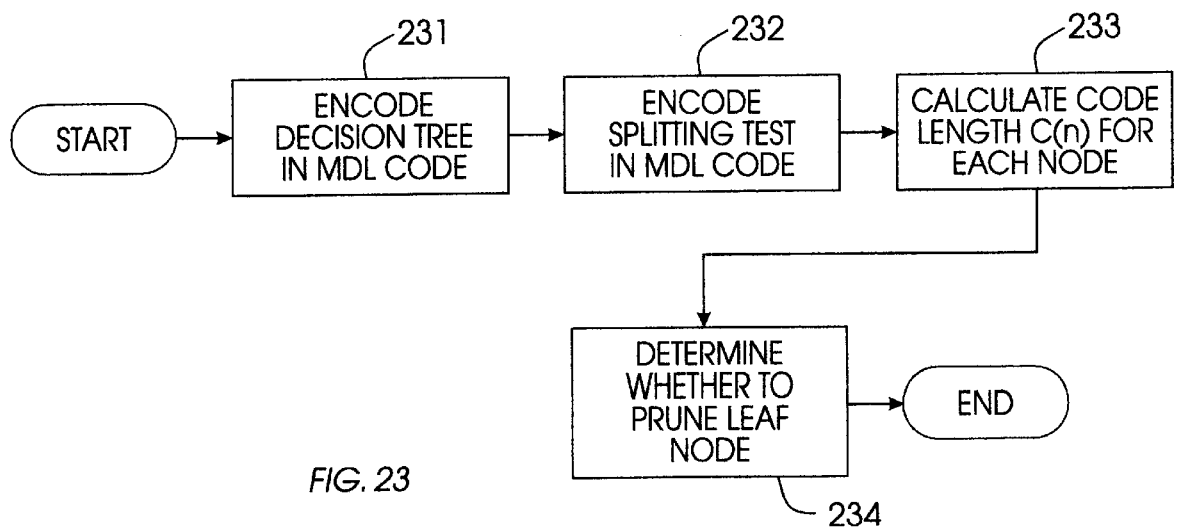
FIG. 23 is a flow chart showing the step of pruning the decision tree based on a Minimum Description Length coding.

Referring to FIG. 23, a typical pruning of the decision tree based on MDL coding is shown. It consists of two main phases: (a) encoding the tree and (b) determining whether to prune the tree and how it is pruned, based on the cost of encoding. First, at block 231, the tree is encoded in a MDL-based code. The preferred encoding methods are described in detail in the assignee's Parallel SPRINT patent application. The split tests for the leaf nodes are also encoded with the MDL-based code, as shown by block 232. Next, for each node n of the tree, a code length C(n) for the node is computed in block 233 for each pruning option, and evaluated in block 234 to determine whether to convert the node into a leaf node, to prune its left or right child node, or to leave node n intact.

The invention, in its preferred embodiments, was described above for a shared-memory multiprocessor system, or a multiprocessor system with a shared-memory programming layer which may in turn implemented on a distributed-memory multiprocessor system. The invention can also be embodied in a uniprocessor or multiprocessor system using any existing thread packages, such as the POSIX thread package (pthread) and its variations supported by various UNIX systems, and the Microsoft NT thread package. In addition, the invention can be implemented in a distributed-memory multiprocessor system, such as the IBM SP2 parallel system, using a message-passing interface. For example, the SUBTREE algorithm, based on the task parallelism, will perform efficiently on a distributed-memory system as well as a shared-memory system. Unlike the parallel SPRINT which requires communication at every level of the decision-tree growth, the SUBTREE algorithm does not require any communication between processors once a processor group contains only one processor.

In addition, although various dynamic scheduling methods were described for assigning and reassigning different attribute lists to different processors, at an examined node, there may be cases where a static scheduling may be preferred. For example, static scheduling can be used in a system where processor synchronization overhead is relatively high (such as a distributed-memory system), or in a system where file I/O operations can only be executed by the processor opening the file.

In this specification, the term processor was used interchangeably with the terms process and thread. In a general setting, the number of threads or processes created to execute the methods of the invention can be larger than, equal to, or smaller than, the number of physical processors on a system. The preferred number depends on various parameters of the system (such as the processor speed, cache size, memory size, memory bandwidth, disk size, disk bandwidth, etc.), the choice of the implementation (e.g., MWK or SUBTREE), the size of the training set, and the complexity of the model for the decision tree.

Using the foregoing specification, the invention may be implemented using standard programming or engineering techniques including computer programming software, firmware, hardware or any combination or subset thereof. Any such resulting program, having computer-readable program code means, may be embodied or provided within one or more computer-readable media, thereby making a computer program product, i.e., an article of manufacture, according to the invention. The computer readable media may be, for instance, a fixed (hard) drive, diskette, optical disk, magnetic tape, semiconductor memory such as read-only memory (ROM), etc., or any transmitting/receiving medium such as the Internet or other communication network or link. The article of manufacture containing the computer programming code may be made and/or used by executing the code directly from one medium, by copying the code from one medium to another medium, or by transmitting the code over a network.

An apparatus for making, using, or selling the invention may be one or more processing systems including, but not limited to, a central processing unit (CPU), memory, storage devices, communication links, communication devices, servers, I/O devices, or any sub-components or individual parts of one or more processing systems, including software, firmware, hardware or any combination or subset thereof, which embody the invention as set forth in the claims.

User input may be received from the keyboard, mouse, pen, voice, touch screen, or any other means by which a human can input data to a computer, including through other programs such as application programs.

One skilled in the art of computer science will easily be able to combine the software created as described with appropriate general purpose or special purpose computer hardware to create a computer system or computer sub-component embodying the invention and to create a computer system or computer sub-component for carrying out the method of the invention.

While several preferred embodiments of the invention have been described, it should be apparent that modifications and adaptations to those embodiments may occur to persons skilled in the art without departing from the scope and the spirit of the present invention as set forth in the following claims.

What is claimed is:

1. A method for generating a decision-tree classifier in a shared-memory multiprocessor system from a set of records, the tree having a plurality of nodes, the method comprising the steps of:

(a) generating cooperatively by the processors, in the shared memory, an attribute list for each attribute of the records, the attribute lists corresponding a current node and including tuples each having information on a record class;

(b) assigning each attribute list of the current node to one of the processors;

(c) each processor accessing the attribute lists assigned to the processor, in the shared memory, to determine a best split for each attribute list;

(d) the processors cooperatively determining, through the shared memory, a global best split for all the attribute lists associated with the current node;

(e) reassigning each attribute list of the current node to one of the processors;

(f) each processor splitting the attribute lists reassigned to the processor according to the global best split into new attribute lists, the new lists corresponding to child nodes of the current node and residing in the shared memory; and (g) repeating steps (b)–(f) with each newly created child node as the current node, until each attribute list for the newly created child nodes includes only tuples of the same record class.

2. The method as recited in claim 1, wherein the steps (b)–(f) are repeated with each newly created child node as the current node, until each attribute list for the newly created child nodes includes no more than a predetermined number of tuples.

3. The method as recited in claim 1, wherein the classifier is a multilevel tree structure, and each level has a plurality of nodes.

4. The method as recited in claim 1, wherein each processor accesses the assigned attribute lists for all of the nodes at the same level of the tree only once in determining the respective best splits.

5. The method as recited in claim 4, wherein a shared variable is used to dynamically synchronize the assignment of the attribute lists to the processors.

6. The method as recited in claim 5, wherein the assignment of the attribute lists to the processors is the same for all of the nodes at the same level of the tree.

7. The method as recited in claim 1, wherein each processor accesses the reassigned attribute lists for all of the nodes at the same level of the tree only once in splitting the reassigned lists.

8. The method as recited in claim 7, wherein a shared variable is used to dynamically synchronize the reassignment of the attribute lists to processors.

9. The method as recited in claim 8, wherein the reassignment of the attribute lists to processors is the same for all of the nodes at the same level of the tree.

10. The method as recited in claim 1, further comprising the step of building a data structure to determine whether a tuple of an attribute list belongs to a left child attribute list or a right child attribute list.

11. The method as recited in claim 10, wherein:
the classifier is a multilevel tree structure, each level having a plurality of nodes;
the method further comprises the step of creating, for every K consecutive nodes at the same level of the tree, K different files for storing the attribute lists of the K nodes; and
the determination of the best splits for the respective attribute lists of the K nodes and the building of the data structure for the K nodes are done in parallel by each processor.

12. The method as recited in claim 11, wherein a barrier synchronization between two groups of K nodes is used to prevent any two processors from simultaneously accessing a same file.

13. The method as recited in claim 11, wherein K conditional variables are used to prevent any two processors from simultaneously accessing a same file.

14. The method as recited in claim 1, wherein:
all processors of the system are initially associated with the current node;
the processors to which the attribute lists are assigned and reassigned are selected from the processors associated with the current node; and
when the child nodes are created from the current node, the processors associated with the current node are divided into two subsets, each associated with a child node.

15. The method as recited in claim 14, wherein:
a processor becomes free when all the nodes associated with the processor can no longer be split; and
the free processor would join the other processors in processing the attributes lists for other nodes.

16. The method as recited in claim 1, further comprising the step of pruning the decision-tree classifier to obtain a more compact classifier.

17. The method as recited in claim 16, wherein the step of pruning is based on a Minimum Description Length model of the classifier.

18. A computer program product for use with a shared-memory multiprocessor system for generating a decision-tree classifier from a set of records, the tree having a plurality of nodes, the product comprising:

a computer-readable medium;
means, provided on the computer-readable medium, for directing the processors to cooperatively generate in the shared memory an attribute list for each attribute of the records, the attribute lists corresponding a current node and including tuples each having information on a record class;
means, provided on the computer-readable medium, for directing the system to assign each attribute list of the current node to one of the processors;
means, provided on the computer-readable medium, for directing each processor to access the attribute lists assigned to the processor, in the shared memory, and determine a best split for each attribute list;
means, provided on the computer-readable medium, for directing the processors to cooperatively determine, through the shared memory, a global best split for all the attribute lists associated with the current node;
means, provided on the computer-readable medium, for directing the processors to reassign each attribute list of the current node to one of the processors;
means, provided on the computer-readable medium, for directing each processor to split the attribute lists reassigned to the processor according to the global best split into new attribute lists, the new lists corresponding to child nodes of the current node and residing in the shared memory; and
means provided on the computer-readable medium, for directing the processors to process each newly created child node as the current node, until each attribute list for the newly child nodes includes only tuples of the same record class.

19. The computer program product as recited in claim 18, wherein the each newly created child node is processed as the current node until each attribute list for the newly created child nodes includes no more than a predetermined number of tuples.

20. The computer program product as recited in claim 18, wherein the classifier is a multilevel tree structure, and each level has a plurality of nodes.

21. The computer program product as recited in claim 18, wherein each processor accesses the respective assigned attribute lists for all of the nodes at the same level of the tree only once in determining the respective best splits.

22. The computer program product as recited in claim 21, wherein a shared variable is used to dynamically synchronize the assignment of the attribute lists to the processors.

23. The computer program product as recited in claim 22, wherein the assignment of the attribute lists to the processors is the same for all of the nodes at the same level of the tree.

24. The computer program product as recited in claim 18, wherein each processor accesses the reassigned attribute lists for all of the nodes at the same level of the tree only once in splitting the reassigned lists.

25. The computer program product as recited in claim 24, wherein a shared variable is used to dynamically synchronize the reassignment of the attribute lists to processors.

26. The computer program product as recited in claim 25, wherein the reassignment of the attribute lists to processors is the same for all of the nodes at the same level of the tree.

27. The computer program product as recited in claim 18, further comprising means, provided on the computer-readable medium, for directing the system to build a data structure to determine whether a tuple of an attribute list belongs to a left child attribute list or a right child attribute list.

28. The computer program product as recited in claim 27, wherein:
- the classifier is a multilevel tree structure, each level having a plurality of nodes;
- the computer program product further comprises means, provided on the computer-readable medium, for directing the system to create, for every K consecutive nodes at the same level of the tree, K different files for storing the attribute lists of the K nodes; and
- the determination of the best splits for the respective attribute lists of the K nodes and the building of the data structure for the K nodes are done in parallel by each processor.

29. The computer program product as recited in claim 28, wherein a barrier synchronization between two groups of K nodes is used to prevent any two processors from simultaneously accessing a same file.

30. The computer program product as recited in claim 28, wherein K conditional variables are used to prevent any two processors from simultaneously accessing a same file.

31. The computer program product as recited in claim 18, wherein:
- all processors of the system are initially associated with the current node;
- the processors to which the attribute lists are assigned and reassigned are selected from the processors associated with the current node; and
- when the child nodes are created from the current node, the processors associated with the current node are divided into two subsets, each associated with a child node.

32. The computer program product as recited in claim 31, wherein:
- a processor becomes free when all the nodes associated with the processor can no longer be split; and
- the free processor would join the other processors in processing the attributes lists for other nodes.

33. The computer program product as recited in claim 18, further comprising means, provided on the computer-readable medium, for directing the system to prune the decision-tree classifier to obtain a more compact classifier.

34. The computer program product as recited in claim 33, wherein the pruning is based on a Minimum Description Length model of the classifier.

35. A database system for generating a decision-tree classifier in a shared-memory multiprocessor computer from a set of records, the tree having a plurality of nodes, the system comprising:
- means for generating cooperatively by the processors, in the shared memory, an attribute list for each attribute of the records, the attribute lists corresponding a current node and including tuples each having information on a record class;
- means for assigning each attribute list of the current node to one of the processors;
- means for accessing the attribute lists in the shared memory, by each processor, to determine a best split for each attribute list;
- means for cooperatively determining by the processors, through the shared memory, a global best split for all the attribute lists associated with the current node;
- means for reassigning each attribute list of the current node to one of the processors;
- means for splitting, by each processor, the reassigned attribute lists according to the global best split into new attribute lists, the new lists corresponding to child nodes of the current node and residing in the shared memory; and
- means for processing each newly created child node as the current node, until each attribute list for the newly created child nodes includes only tuples of the same record class.

36. The system as recited in claim 35, wherein each newly created child node is processed as the current node until each attribute list for the newly created child nodes includes no more than a predetermined number of tuples.

37. The system as recited in claim 35, wherein the classifier is a multilevel tree structure, and each level has a plurality of nodes.

38. The system as recited in claim 35, wherein each processor accesses the assigned attribute lists for all of the nodes at the same level of the tree only once in determining the respective best splits.

39. The system as recited in claim 38, wherein a shared variable is used to dynamically synchronize the assignment of the attribute lists to the processors.

40. The system as recited in claim 39, wherein the assignment of the attribute lists to the processors is the same for all of the nodes at the same level of the tree.

41. The system as recited in claim 35, wherein each processor accesses the reassigned attribute lists for all of the nodes at the same level of the tree only once in splitting the reassigned lists.

42. The system as recited in claim 41, wherein a shared variable is used to dynamically synchronize the reassignment of the attribute lists to processors.

43. The system as recited in claim 42, wherein the reassignment of the attribute lists to processors is the same for all of the nodes at the same level of the tree.

44. The system as recited in claim 35, further comprising means for building a data structure to determine whether a tuple of an attribute list belongs to a left child attribute list or a right child attribute list.

45. The system as recited in claim 44, wherein the classifier is a multilevel tree structure, each level having a plurality of nodes;
- the system further comprises means for creating, for every K consecutive nodes at the same level of the tree, K different files for storing the attribute lists of the K nodes; and
- the determination of the best splits for the respective attribute lists of the K nodes and the building of the data structure for the K nodes are done in parallel by each processor.

46. The system as recited in claim 45, wherein a barrier synchronization between two groups of K nodes is used to prevent any two processors from simultaneously accessing a same file.

47. The system as recited in claim 45, wherein K conditional variables are used to prevent any two processors from simultaneously accessing a same file.

48. The system as recited in claim 35, wherein:
- all processors of the computer are initially associated with the current node;
- the processors to which the attribute lists are assigned and reassigned are selected from the processors associated with the current node; and when the child nodes are created from the current node, the processors associated with the current node are divided into two subsets, each associated with a child node.

49. The system as recited in claim 48, wherein:

a processor becomes free when all the nodes associated with the processor can no longer be split; and the free processor would join the other processors in processing the attributes lists for other nodes.

50. The system as recited in claim 35, further comprising means for pruning the decision-tree classifier to obtain a more compact classifier.

51. The system as recited in claim 50 wherein the means for pruning is based on a Minimum Description Length model of the classifier.

* * * * *